US011993508B2

(12) United States Patent
Engelke

(10) Patent No.: US 11,993,508 B2
(45) Date of Patent: May 28, 2024

(54) RIDING SADDLE WITH DAMPING DEVICES AND FORCE ACCUMULATOR

(71) Applicant: Carsten Engelke, Lindwedel (DE)

(72) Inventor: Carsten Engelke, Lindwedel (DE)

(73) Assignee: Carsten Engelke, Lindwedel (DE)

( * ) Notice: Subject to any disclaimer, the term of this patent is extended or adjusted under 35 U.S.C. 154(b) by 47 days.

(21) Appl. No.: 17/496,381

(22) Filed: Oct. 7, 2021

(65) Prior Publication Data

US 2022/0250900 A1 Aug. 11, 2022

(30) Foreign Application Priority Data

Oct. 8, 2020 (DE) ........................ 102020212757.3
Jul. 21, 2021 (EP) .................................... 21187018

(51) Int. Cl.

*B68C 1/16* (2006.01)
*B68C 1/18* (2006.01)
*B68C 1/02* (2006.01)
*B68C 3/00* (2006.01)

(52) U.S. Cl.

CPC ................. *B68C 1/16* (2013.01); *B68C 1/18* (2013.01); *B68C 1/025* (2013.01); *B68C 3/00* (2013.01); *B68C 2003/0041* (2013.01)

(58) Field of Classification Search

CPC .................................. B68C 1/16; B68C 1/18
See application file for complete search history.

(56) References Cited

U.S. PATENT DOCUMENTS

| | | | | | | |
|---|---|---|---|---|---|---|
| 87,749 | A | * | 3/1869 | Zellner | B68C 1/16 | 54/46.2 |
| 220,677 | A | * | 10/1879 | Somerset | B68C 1/16 | 54/46.2 |
| 241,274 | A | * | 5/1881 | Applegate | B68C 1/16 | 54/46.2 |
| 248,920 | A | * | 11/1881 | Chappell | B68C 1/16 | 54/46.2 |
| 267,452 | A | * | 11/1882 | Oldmeadow | B68C 1/16 | 54/46.2 |
| 474,715 | A | * | 5/1892 | Bailey | B68C 1/16 | 54/46.1 |
| 577,541 | A | * | 2/1897 | Wagemann | B68C 1/16 | 54/46.2 |
| 740,932 | A | * | 10/1903 | Schuett | B68C 1/16 | 54/46.1 |
| 751,865 | A | * | 2/1904 | Martin | B68C 1/16 | 54/46.1 |

(Continued)

FOREIGN PATENT DOCUMENTS

| | | | |
|---|---|---|---|
| DE | 29818118 | U1 | 1/1991 |
| DE | 9214548 | U1 | 12/1992 |
| EP | 2327657 | A1 | 6/2011 |

*Primary Examiner* — Jessica B Wong

(74) *Attorney, Agent, or Firm* — Greer, Burns & Crain, Ltd.; Steven P. Fallon

(57) ABSTRACT

A riding saddle having a saddle tree, a seat surface arranged thereon, and on each side of the saddle a stirrup holder fixed to the saddle, and which riding saddle is characterized in that a damping device is attached between the saddle and each stirrup holder. During the landing of a horse at the end of a jump, the damping device distributes the load by the mass of the rider applied to the stirrup holders over a period of time.

18 Claims, 9 Drawing Sheets

(56) References Cited

U.S. PATENT DOCUMENTS

| | | | | | |
|---|---|---|---|---|---|
| 918,212 | A | * | 4/1909 | Solatinow | B68C 1/16 54/46.1 |
| 1,301,838 | A | | 4/1919 | Guerrero | |
| 1,323,311 | A | * | 12/1919 | Persson | B68C 1/16 54/46.2 |
| 2,739,434 | A | * | 3/1956 | Bell | B68C 1/16 54/46.2 |
| 4,782,649 | A | * | 11/1988 | Zubrod | B68C 1/16 54/46.2 |
| 4,924,660 | A | * | 5/1990 | Norman | B68C 1/16 54/46.2 |
| 5,107,660 | A | * | 4/1992 | Mommeja | B68C 1/16 54/46.1 |
| 2003/0051448 | A1 | * | 3/2003 | Johnson | B68C 3/02 54/48 |
| 2006/0144023 | A1 | * | 7/2006 | James | B68C 1/16 54/46.1 |

* cited by examiner relative movement between stirrup holder
and saddle tree

RIDING SADDLE WITH DAMPING DEVICES AND FORCE ACCUMULATOR

PRIORITY CLAIM

The present application claims priority of German patent application 102020212757.3, filed on 8 Oct. 2020, and of European patent application EP21187018.3, filed on 21 Jul. 2021.

FIELD OF THE INVENTION

The present invention relates to a riding saddle for use on a horse, in particular to a saddle having knee rolls attached to the saddle flaps, the saddle being designed as a jumping saddle and e.g. having saddle flaps which are drawn far forward and which can have high knee rolls.

Further, the invention relates to a process for the production of a riding saddle according to the invention from a conventional riding saddle.

BACKGROUND

U.S. Pat. No. 1,301,838 describes a saddle in which the seat surface is guided slidably and in a spring-loaded manner on posts that stand vertically on top of a pack saddle having two plates to be arranged along the horse, which saddle is to rest on a horse's back.

EP 2327657 A1 describes a jumping saddle having two saddle trees, wherein the upper saddle tree is slidably guided along the lower saddle tree and this movement is dampened by dampers.

SUMMARY OF THE INVENTION

A preferred riding saddle includes a saddle tree and a seat surface arranged thereon. On each side of the saddle is a stirrup holder having damping devices arranged between the saddle and each stirrup holder and/or between the saddle tree and a saddle flap supporting a knee roll. The damping devices includes a first carrier connected to the saddle and a second carrier pivotally connected to the first carrier by a first lever. The stirrup holder is attached to the second carrier and has an energy accumulator set up to counteract the movement of the second carrier into a greater distance from the first carrier.

DETAILED DESCRIPTION OF THE PREFERRED EMBODIMENTS

Figure 1:
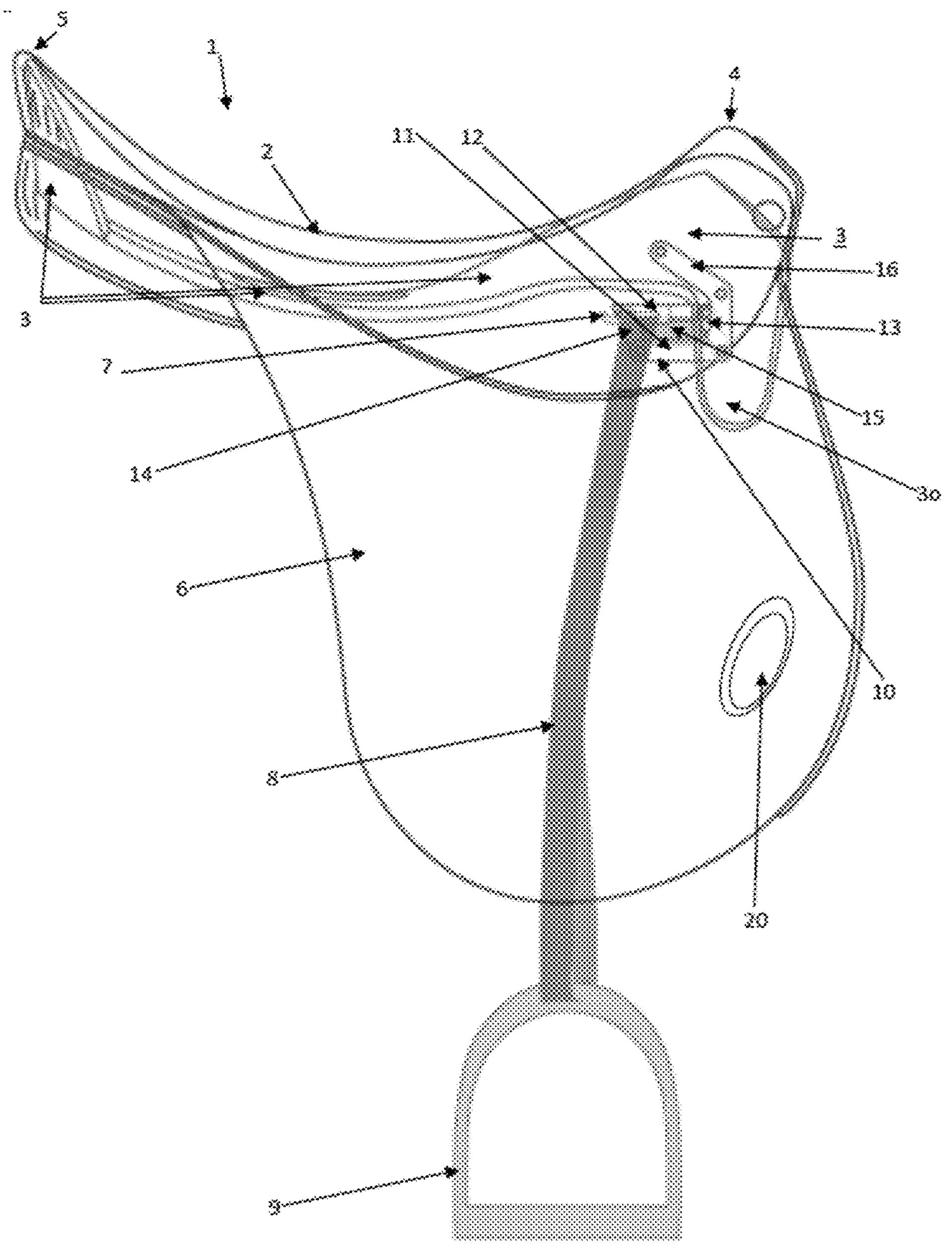
FIG. 1 a saddle according to the invention in side view.

The saddle according to the invention has a saddle tree, preferably with tree tips at its front end, and on the saddle tree a seat surface which is padded towards the saddle tree and which extends along a longitudinal axis of the saddle tree and of the saddle from its front end to its rear end, and which seat surface preferably is concave, e.g. having a pommel at the front end and/or having a cantle at the rear end. The saddle tree is concave on its side facing a horse and is convex on its side facing the seat surface. On each side, a stirrup leather is attached to the saddle, in particular by means of a stirrup holder, e.g. in the form of a short strap, preferably in the form of a hook, wherein one end of a stirrup leather can be fixed to the stirrup holder, to the opposite end of which stirrup leather a stirrup is attached. The stirrup holder on each side can be attached directly to the saddle tree, e.g. by a rigid connection, or can be indirectly connected to the saddle tree, e.g. by the stirrup holder being attached to an element of the saddle which is connected to the saddle tree, e.g. between the saddle tree and the seat surface. For attachment to a horse, a girth is attachable to the saddle, which girth can be tightened around the belly of a horse upon placement of the saddle on the horse's back. The longitudinal axis of the saddle or resp. of the saddle tree extends along the horse's back upon placement of the saddle on a horse. A saddle tree can be single-pieced and can e.g. consist of plastic, optionally fiber-reinforced.

Generally, a saddle is adapted to a horse so that when the saddle is placed on the horse, the seat surface has a desired inclination to the horizontal between the front and the rear end or resp. along the longitudinal axis.

The saddle according to the invention has the advantage of behaving normally during normal riding, e.g. in a rest position of the horse and/or when walking, trotting or cantering, and optionally of springing the stirrup holders. This is also termed as the first position. For jumping, especially during landing of the horse at the end of the jump, the saddle has the advantage of distributing over a period of time or resp. of damping the load acting by the mass of the rider onto the stirrup holders and/or onto the knee rolls.

An object of the invention is to provide an alternative riding saddle, preferably a jumping saddle, which permits a damping of pulsatingly occurring loads, in particular a damping of pulsating loads, such as they occur during jumping of the horse due to the weight of a rider. Preferably, the jumping saddle shall provide damping only during certain phases of the horse's movement, in particular during the landing of a jumping horse on its front hooves, and further preferably shall provide less or no damping of the load during other phases of movement, e.g. during a horse's take-off or during a gait such as walk, trot or canter.

The invention achieves the object by a riding saddle having a saddle tree, a seat surface arranged thereon and, on each side of the saddle, a stirrup holder attached to the saddle. The saddle according to the invention is characterized in that on each side of the saddle, between the saddle, in particular the saddle tree, and each stirrup holder and/or between the saddle tree and a saddle flap supporting a knee roll, one damping device each or a common damping device is attached, and/or between each of the saddle and the knee rolls a damping device is attached. Therein, each stirrup holder and knee roll attached to one side of the saddle can be attached to a common damping device such that the saddle on each side has 1 damping device to which the stirrup holder and knee roll are attached. Alternatively, each stirrup holder and knee roll can each be attached to a separate damping device. The portion of the saddle to which the damping device supporting the knee roll is attached can be the saddle tree or a saddle flap that is fixedly attached to the saddle tree.

Preferably, the damping device by its first carrier is attached to the saddle, in particular is fixed to the saddle tree, and a receptacle for a stirrup leather is attached to the second carrier of the damping device, which second carrier is movable relative to the first carrier. During the landing of a horse at the end of a jump, the damping device distributes the load of the mass of the rider acting on the stirrup holders over a period of time. The receptacle for a stirrup leather, also referred to as a stirrup holder, can e.g. be a bar that is arranged approximately horizontally upon placement of the saddle on a standing horse, so that an eyelet of a stirrup leather can be hooked thereto by sliding along the bar or resp. along the stirrup holder. Preferably, the knee rolls are attached on a saddle flap which is attached to the damping device, so that each knee roll is attached or connected to a damping device by means of a saddle flap. The saddle flap by which a knee roll is attached to a damping device can be arranged below a second saddle flap having a recess through which the knee roll extends. Therein, the second saddle flap can be fixedly connected to the seat surface.

The saddle can e.g. have a flap attached to the seat surface, which flap covers the damping device.

Preferably, the saddle flap by which a knee roll is attached to a damping device is the only saddle flap on each side of the saddle which further preferably has on each side a flap attached to the seat surface, which flap covers the edge of the saddle flap facing the seat surface, optionally also covers the damping device.

It has shown that riders during the downward movement of a jump and during the landing of the horse not only support their weight on the stirrups, but, individually varying, support their weight at least partially on the knee rolls. In one embodiment of the invention, the stirrup holders, optionally exclusively these, can therefore be attached to a damping device arranged between the saddle and the stirrup holders. In a further embodiment, a damping device can be arranged between the knee rolls, or resp. between the saddle flaps supporting the knee rolls, and the saddle tree. In a still further embodiment, a damping device can be arranged both between the saddle and each stirrup holder, as well as a damping device can be arranged between the knee rolls, or resp. between the saddle flaps supporting the knee rolls, and the saddle tree. In the still further embodiment, one damping device to which a stirrup holder is attached, and a further damping device to which a knee roll or resp. a saddle flap supporting a knee roll is attached, can be arranged on each side of the saddle. In the still further embodiment, the two damping devices attached to each side of the saddle can each be attached to the saddle tree, alternatively one of these two damping devices can be attached to the respective other one, e.g. the first damping device, to which a stirrup holder is attached, can be fixed directly to the saddle tree, the second damping device, to which a knee roll or resp. a saddle flap supporting a knee roll is attached, can be attached to the second carrier of the first damping device. Alternatively, the first damping device to which a stirrup holder is attached can be attached to the second carrier of the second damping device to which a knee roll or a saddle flap supporting a knee roll is attached, wherein the second damping device is fixed directly to the saddle tree. Generally, the damping devices arranged on the same side of the saddle can be the same or different.

In embodiments in which the stirrup holder is attached to a first damping device and a second damping device is arranged between the saddle and the knee roll, in particular between the saddle tree and a saddle flap supporting the knee roll or between a saddle flap and the knee roll, the second damping device can be a spring element, e.g. a tension spring made of metal or of polymer. This is because it has shown that a second damping device that elastically holds and springs the knee rolls is sufficient both when the saddle is placed on the horse in the resting position of the horse and/or when the horse is walking, trotting or galloping.

In embodiments in which the stirrup holder and the saddle flap supporting the knee roll are each connected to the saddle, in particular to the saddle tree, by separate damping devices, this saddle flap is optionally connected to the saddle tree exclusively by means of a damping device. Alternatively, this saddle flap supporting the knee roll is additionally pivotally connected to the saddle tree at a pivot point at a distance from the damping device arranged between the saddle flap and the saddle tree. In the alternative, the saddle flap supporting the knee roll is connected to the saddle tree only at a pivot point and at a distance therefrom by means of the damping device, so that this saddle flap is pivotable to the saddle tree about the pivot point during loading of the damping device, wherein the pivoting is damped and limited by the damping device.

In embodiments in which the stirrup holder and the saddle flap supporting the knee roll are each connected to the saddle tree by separate damping devices, this saddle flap can be fixedly connected to the saddle tree and a damping device can be attached between the saddle flap and the knee roll. Therein, the damping device can be a force accumulator, e.g. a tension spring or compression spring made of metal or polymer.

Alternatively, a stirrup holder and a knee roll or resp. a saddle flap supporting a knee roll can be attached to a common damping device, one each on each side of the saddle, so that the movement of stirrup holder and saddle flap with knee roll can occur simultaneously and without displacement relative to one another from the saddle tree and so that a rider during movement thereof experiences no relative movement between the stirrup and knee roll due to the one common damping device.

Generally preferably, the stirrup holder and a stirrup leather attached thereto are arranged below the saddle flap supporting the knee roll.

The damping device has at least one first carrier connected to the saddle and has one second carrier hinged to the first carrier by means of a first lever, to which second carrier the stirrup holder and/or the saddle flap having a knee roll is attached. The stirrup holder can be pivotally or non-rotatably connected to the first lever. Optionally, the stirrup holder can be a part of the second carrier. Generally optionally, the second carrier can be non-rotatably formed with the first lever, optionally single-pieced. The saddle flap, which has a knee roll, is e.g. attached to the second carrier of the damping device.

Optionally, the damping device on its first carrier has a mounting arm that is rigidly connected to the first carrier, which is fixed to the saddle, in particular to the saddle tree. Alternatively, the first carrier forms a mounting arm, or the first carrier is directly connected to the saddle, in particular directly fixed to the saddle tree.

The first carrier is connected to the second carrier by means of a first lever, and preferably optionally additionally by means of a second lever spaced apart from the first lever, which are each pivotally hinged at their ends to the first and second carriers. The first lever and the optional second lever pivotally connect the first carrier to the second carrier by the first end of each lever being pivotally hinged to the first carrier and the opposite second end of each lever being pivotally hinged to the second carrier. In embodiments in which the second carrier is pivotally hinged to the first carrier by means of only one lever, the second carrier can consist of a stirrup holder.

In one embodiment, the damping device comprises a first carrier and a first lever pivotally hinged thereon to which a stirrup holder is pivotally or non-rotatably attached opposite to the first carrier, or the damping device consists thereof. Preferably, the first carrier is arranged at a greater distance from the seat surface than the second carrier or than the end of the first lever lying opposite to the first carrier, so that the first carrier is fixed to the saddle below the stirrup holder when the seat surface is arranged above the stirrup holder.

In embodiments having a first lever and a second lever, their first ends are hinged to the first carrier at a first distance from one another, and the second ends of the levers are hinged to the second carrier at a second distance from one another. The first distance, at which the first ends of the first lever and of the second lever are hinged to the first carrier, can be greater than or less than, preferably equal to, the second distance, at which the second ends of the first lever and the second lever are hinged to the second carrier.

The first lever can be shorter or longer than the second lever, preferably the first and second levers are of equal length. When the first and second levers are of equal length and the first distance at which their first ends are hinged to the first carrier is equal to the second distance at which the second ends of the levers are hinged to the second carrier, the levers with the carriers form a parallelogram.

The pivot joints by which levers are pivotally hinged to carriers can be formed by a respective pin being movably arranged through a bore through the carrier and lever.

Generally preferably, the first carrier is arranged at a greater distance from the seat surface than the end of the first lever and/or of the second lever which lies opposite to the first carrier, and/or than the second carrier, so that the first carrier is fixed to the saddle below the second carrier when the seat surface is arranged above the stirrup holder. Accordingly, the second carrier is preferably arranged closer to the plane in which the seat surface lies than the first carrier.

Optionally, a stop is arranged on or between the carriers, on or between the first lever and the optional second lever, or on or between at least one carrier and a lever, which stop limits the pivoting of the carriers and the lever towards one another, or which stop limits the pivoting of the carriers in the first position into their smallest distance. Such an optional stop can e.g. be arranged between the carriers, e.g. be fixed to one of the carriers, so that the carriers can only move towards one another into their smallest distance until one or both of them rest against the stop. The stop can be formed by the surfaces of the carriers facing one another, so that the carriers themselves form the stop and rest against one another. Optionally, a stop is buffered, e.g. with or of an elastic material, in particular with or of a rubber buffer. A stop can optionally be formed by a force accumulator, e.g. a rubber buffer, which is arranged between the first and the second carriers, so that the force accumulator forms a springy stop between these carriers.

For the spring action, at least one force accumulator is connected to the carriers and/or to the first lever and to an optional second lever, wherein the force accumulator is set up to load the carriers into a first position in which they are arranged closer to one another than at their maximum distance from one another, in which the levers extend maximally away from the carriers, resp. which is limited by the length of the levers. The force accumulator is set up to be tensioned when the second carrier from the first position is pivoted away from the first carrier. Accordingly, the force accumulator is set up to delay the pivoting of the second carrier from the first position and to transmit to the first carrier with a delay a load, which loads the second carrier into the second position.

Preferably, the at least one force accumulator is set up to load the carriers into a first position in which they are e.g. arranged at their smallest distance from one another. The force accumulator can e.g. be a tension spring that is attached to the carriers, or to a carrier and a lever, or to the pivot joints by which a lever is hinged to a first carrier and optionally to a second carrier, which carriers are at a smaller distance from one another in the first position. Alternatively, the force accumulator can be a compression spring which is attached to the carriers, or to the pivot joints on a first and a second carrier, which are spaced apart by a greater distance in the first position than in the second position. A compression spring can be a steel spring or a rubber buffer. A tension spring is preferably a steel spring. Alternatively, the force accumulator can be a gas pressure spring or a liquid-filled shock absorber, optionally in combination with a tension spring or compression spring for resetting. The force accumulator is therefore set up to counteract the movement of the second carrier from the first position into a greater distance from the first carrier, e.g. into a second position, wherein the second position lies beyond the apex of the pivoting movement or resp. of the pivoting radius of the first lever.

For a flat construction of the damping device in perpendicular to the pivot axis, the first and second carriers and the first lever are pivotable in a common plane, and in the optional embodiment, the optional second lever is preferably also pivotable in this common plane.

The damping device is preferably fixed to the saddle in an orientation in which it is in its first position when the saddle is placed on the horse in the rest position of the horse and/or when the horse is walking, trotting or cantering, so that the force accumulator is relaxed or loads the first lever and/or the second carrier into the first position, and the second carrier and/or so that the stirrup holder is arranged at the smallest distance from the first carrier, wherein preferably the first lever and/or the second carrier rest against a stop, and the damping device is fixed to the saddle in an orientation in which, upon longitudinal inclination of the saddle and/or upon longitudinal inclination of the horse's back with the saddle resting thereon, in which the front end of the saddle is arranged lower than the rear end of the saddle, the second carrier is pivoted over the apex of the pivoting of the first lever and/or of the optional second lever into the second position exclusively by tensile load on the stirrup holder downwardly, and the force accumulator is tensioned in the process. The pivoting from the first position into the second position is caused by the movement of the saddle into a greater longitudinal inclination and by the downward tensile loading of the stirrup holder, and in the process the force accumulator is tensioned. Therefore, the saddle is set up such that the pivoting of the first lever and/or of the optional second lever beyond the apex of the pivoting, in particular from the first position into the second position, occurs upon tensile loading on the stirrup holder depending on the longitudinal inclination of the saddle.

A tension spring as a force accumulator is stretched when the second carrier pivots from the first position into the second position. A compression spring as a force accumulator is pressed when the second carrier pivots from the first position into the second position.

Preferably, the second carrier is hinged to the first carrier by means of the first lever, and the first carrier is fixed to the saddle in an orientation in which the first lever is arranged on a first side of the apex of the pivoting of the first lever when the saddle is placed on the horse in the rest position of the horse and/or when the horse is walking, trotting or galloping. The arrangement of the first lever on the first side of the apex of its pivoting is also referred to as the first position of the damping device. When arranging the first lever on the first side of the apex of its pivoting, the second carrier is at its smallest distance from the first carrier and the force accumulator is relaxed, preferably the second carrier rests against a stop. The apex of the pivoting of the first lever can be the position of the first lever in which the second carrier is at its maximum distance from the first carrier.

Preferably, the damping device is fixed to the saddle in an orientation in which the first lever, when exceeding an inclination of the longitudinal axis of the saddle, is moved into an orientation in which the damping device pivots from the first position into the second position, or resp. in which the apex of the movement of the first lever is moved beyond the vertical.

Preferably, the first lever and the second lever are pivotally connected to the first carrier in parallel.

Alternatively, the first carrier is arranged at a smaller distance from the seat surface than the second carrier and/or than the end of the second lever lying opposite to the first carrier, so that when the seat surface is arranged above the stirrup holder, the second carrier, or resp. the end of the first lever lying opposite to the first carrier, and, when applicable, the end of the second lever lying opposite to the first carrier, is arranged below the first carrier.

Preferably, the damping device is fixed to the saddle in an orientation in which the apex of the pivoting, in which the carriers are arranged at their greatest distance from one another, is reached at a longitudinal inclination of the saddle in which the damping effect and thus the delay of the tensile load on the saddle is desired. The damping device can e.g. be fixed to the saddle in an orientation in which the apex of the pivoting of the first lever is reached or exceeded only when the longitudinal axis is inclined by at least 10°, by at least 15°, by at least 20° or by at least 30° more with respect to the resting position of the horse and/or to when the horse is walking, trotting or galloping on a plane, with the front end lower than the rear end.

Preferably, the damping device is fixed to the saddle in an orientation in which upon longitudinal inclination of saddle when a horse lands on its front hooves after a jump, the second carrier can pivot from the first into the second position with a tensile load acting vertically downward on the stirrup holder.

In an embodiment in which the stirrup holder is fixed to the saddle tree without a damping device, e.g. is fixed directly to the saddle tree, in particular by a leather strap, and in which a damping device is attached between the saddle tree and the knee roll or between the saddle flap supporting the knee roll and the knee roll, this damping device can be a force accumulator, e.g. a tension spring made of metal or of polymer, or can be a damping device as described with respect to the damping device for the stirrup holder.

Generally, the saddle, e.g. its saddle tree, can be inclined along its longitudinal axis in the second position of the damping device by at least 10°, by at least 15°, by at least 20°, or by at least 30° more than in the first position, with the front end lower than the rear end.

Presently, a jump is e.g. a jump over an obstacle height of at least 1 m, preferably at least 1.5 m.

By the force accumulator, the pivoting from the first into the second position is delayed, so that the tensile load acting on the stirrup holder acts with a delay on the first carrier and then on the saddle. This delay results in a distribution over time of the tensile load pulling on the stirrup holders, which are arranged on both sides of the saddle, and avoids a higher peak load. By the delayed action of the tensile load pulling on the stirrup holders, the peak load on the horse, especially on its front legs, is reduced, particularly during landing of a horse after a jump.

The process of manufacturing a saddle according to the invention comprises the step of fixing the damping device to a saddle, preferably by the first carrier to its saddle tree, so that the damping device is attached between the saddle, preferably the saddle tree, and the stirrup holder or resp. each stirrup.

FIG. 1 shows a saddle 1 with a seat surface 2 resting on a saddle tree 3. The saddle has a pommel 4 at the front end and a cantle 5 at the rear end. The padding between the seat surface 2 and the saddle tree 3 is not shown. On both sides of the seat surface 2, saddle flaps 6 are attached which hang downward or which extend opposite to the seat surface 2. The saddle tree 3 has tree tips 3*o* at the front end.

A stirrup holder 7 is attached to the saddle tree 3 by means of a damping device 10, to which stirrup holder 7 a stirrup leather 8 is suspended, and a stirrup 9 is attached to the opposite end of the stirrup leather 8.

According to the preferred embodiment, the damping device 10 has a first carrier 11 and a second carrier 12 hinged thereto by means of a first lever 13, and a second lever 14 which is arranged in parallel to the first lever 13 and which pivotally hinges the second carrier 12 to the first carrier 11. The first carrier 11 is fixed to the saddle 1, in this case directly to the saddle tree 3, by means of a mounting arm 16 that is formed single-pieced with the first carrier 11. A force accumulator 15, e.g. in the form of a rubber buffer, is attached schematically between the first carrier 11 and the second carrier 12. In its relaxed state, the force accumulator holds the second carrier 12 in the first position on the first carrier 11.

Figure 2:
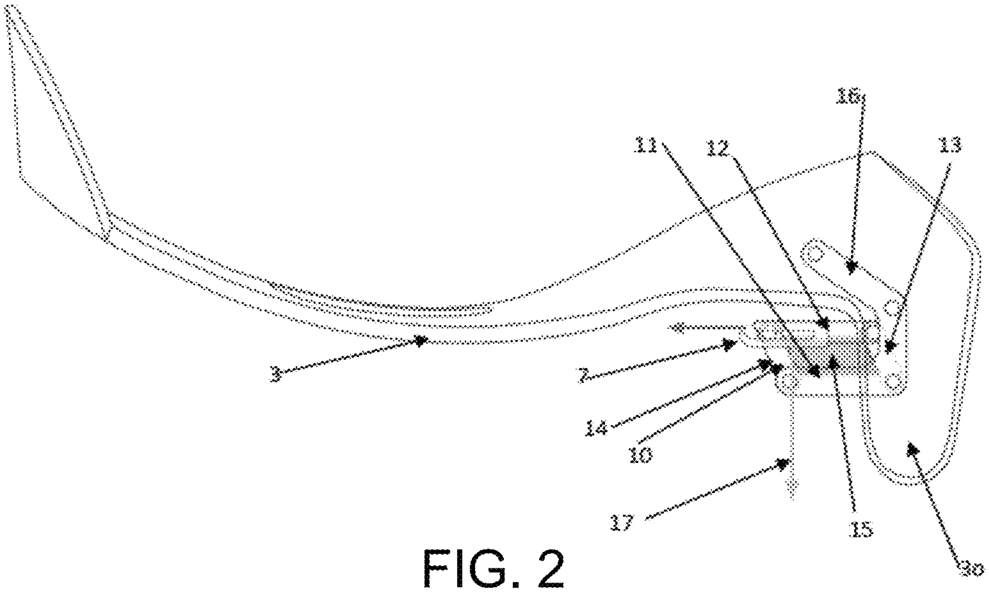
FIG. 2 a saddle tree in approximately horizontal position in side view.
Figure 3:
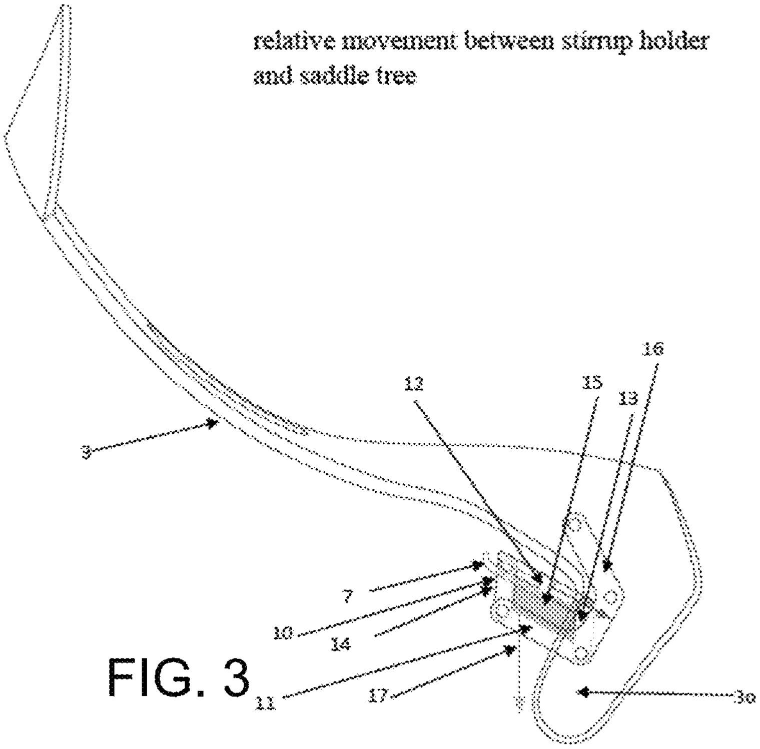
FIG. 3 the saddle tree of FIG. 2 with inclination of the longitudinal axis of the saddle tree, FIGS. 4A-4D an embodiment of the damping device in various positions, FIG. 5A-5C embodiments of the damping device, FIG. 6A-6C a further embodiment of the damping device in various positions, FIG. 7 a further embodiment of the damping device, FIG. 8 a simple embodiment of the damping device, FIG. 9 an embodiment of a saddle according to the invention, FIG. 10 an embodiment of a saddle according to the invention and FIG. 11 an embodiment of a saddle according to the invention.
Figure 4D:
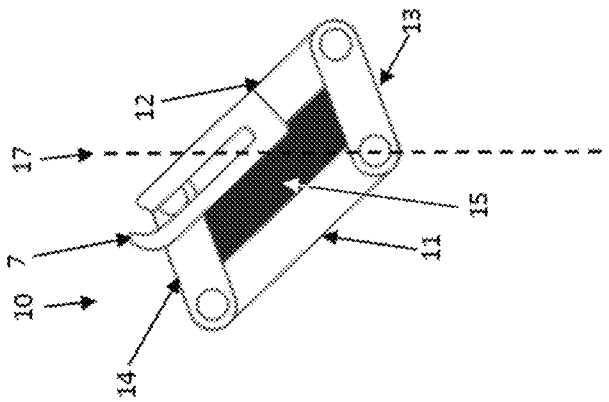
Figure 4C:
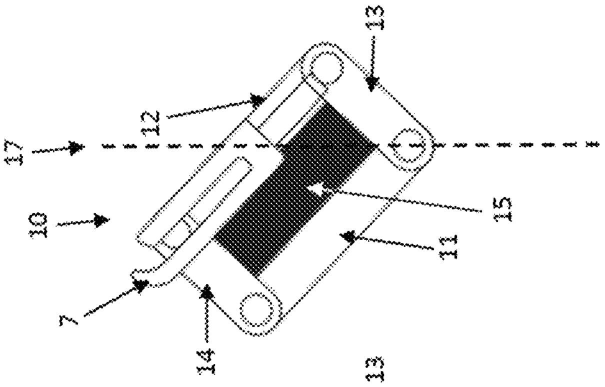
Figure 4B:
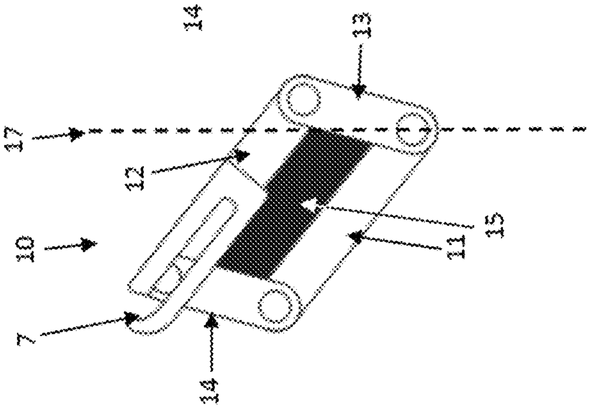
Figure 4A:
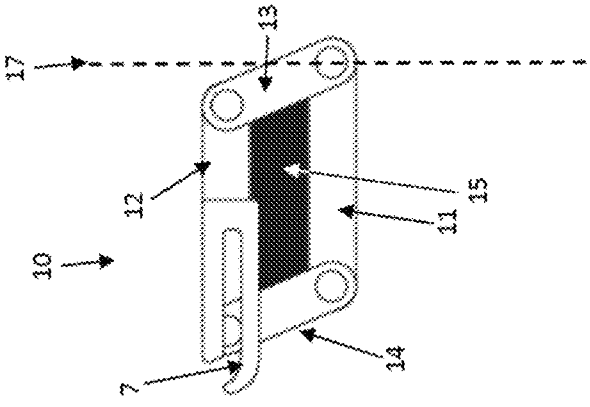

FIG. 2 and FIG. 3 show a saddle tree 3 to which the damping device is attached in the preferred embodiment. In FIG. 2, the saddle tree 3 is shown in an approximately horizontal position. In this first position of the second carrier 12 relative to the first carrier 11, the force accumulator 15 can form a stop for the second carrier 12, e.g. an elastic stop which is arranged between the first and second carriers 11, 12.

In FIG. 3, the saddle tree 3 is inclined forward along its longitudinal axis 18, with the rear end higher than the front end, as it e.g. occurs during landing of a horse on the front hooves after a jump. In this inclination of the longitudinal axis of the saddle 1, the apex of the pivoting of the first lever 13 arrives in front of the vertical 17, and upon downward and/or forward loading of the stirrup holder 7 by the weight of a rider, the second carrier 12 pivots about the first lever 13 into its second position.

FIGS. 4A-4D show a damping device 10 during pivoting of the second carrier 12 into various positions, which can be reached by inclining the longitudinal axis of the saddle 1 with respect to the vertical 17. The figures show the damping device 10 in A) in the rest position of the horse, also referred to as the first position, in which the second carrier 12 is arranged close to the first carrier 11 and the stirrup holder 7 is arranged approximately in perpendicular to the vertical 17, i.e. approximately horizontally, in B) in a position which e.g. occurs shortly after passing the highest point of a jump and the rear end of a saddle is higher than its front end, wherein the entire mass of the rider does not yet act on the stirrup holder 7, but the first lever is in a position in which the apex of the pivoting movement lies beyond the vertical, in C) in a position e.g. prior to the landing after a jump, in which first and second levers 14, 15 are pivoted by loading of the stirrup holder 7 and the second carrier 12 is moved into a greater distance from the first carrier 11, while the force accumulator 15 is tensioned, and in D) in a second position, e.g. during landing, in which the highest load acts on the stirrup holder 7, the first and second levers 14, 15 are pivoted far and the force accumulator is tensioned to the maximum.

Figure 5C:
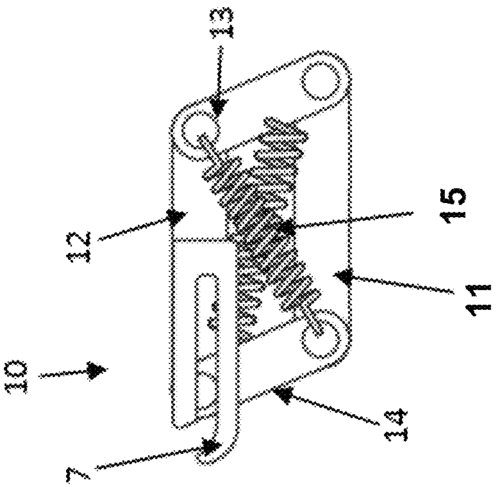
Figure 5B:
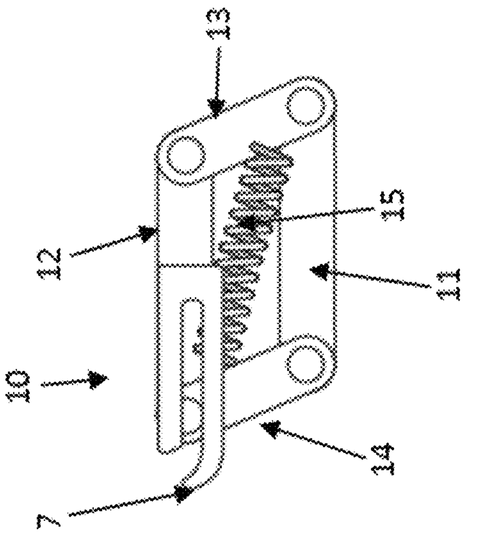
Figure 5A:
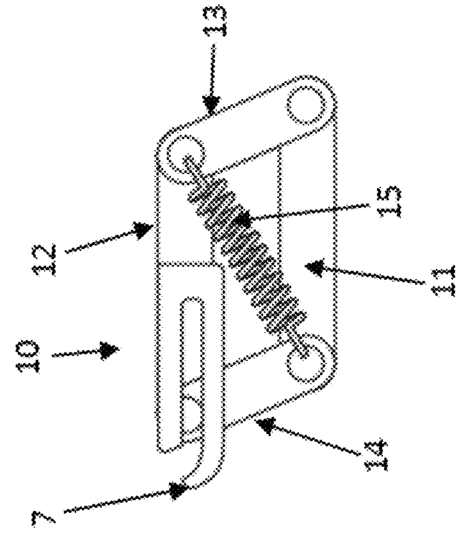

FIGS. 5A-5C show damping devices in which in A) the force accumulator 15 consists of a tension spring loading the first lever 13 into the first position against the first carrier 11, in B) the force accumulator 15 consists of a compression spring loading the second lever 14 into the first position against the first carrier 11, and in C) the force accumulator 15 consists of a combination of a tension spring and a compression spring loading the damping device into the first position.

FIGS. 6A-6D show an alternative embodiment of the damping device 10, in which the first carrier 11 is arranged at a shorter distance from the seat surface than the second carrier 12 and than the end of the first lever 13 and/or the second lever 14 lying opposite to the first carrier 11. When the seat surface is arranged above the stirrup holder 7, the second carrier 12, or resp. the end of the first lever 13 lying opposite to the first carrier 11, is arranged below the first carrier 11. In this embodiment, the stirrup holder 7 and the second carrier 12 hang below the first carrier 11. In A), an optional mounting arm 16 for attachment to a saddle is shown. The mounting arm 16 is attached to the first carrier 11. The first carrier 11 can be attached directly to the saddle, in particular to the saddle tree, without mounting arm 16.

Figure 6C:
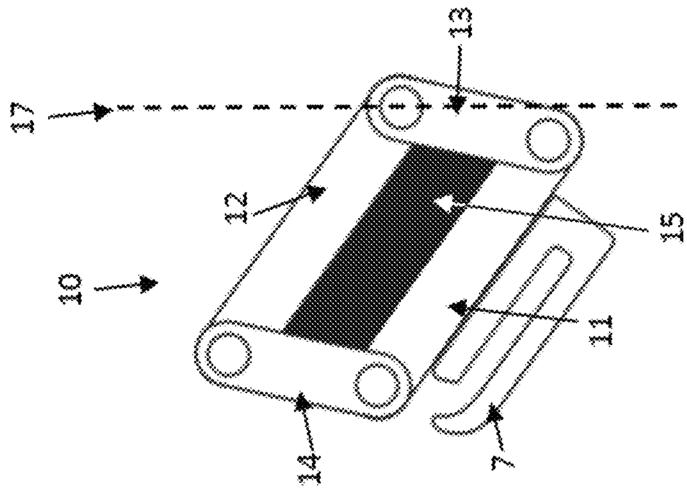
Figure 6B:
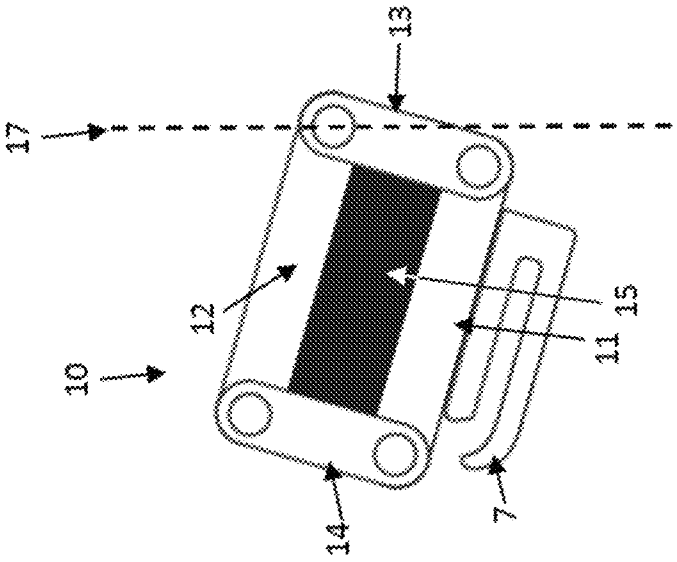
Figure 6A:
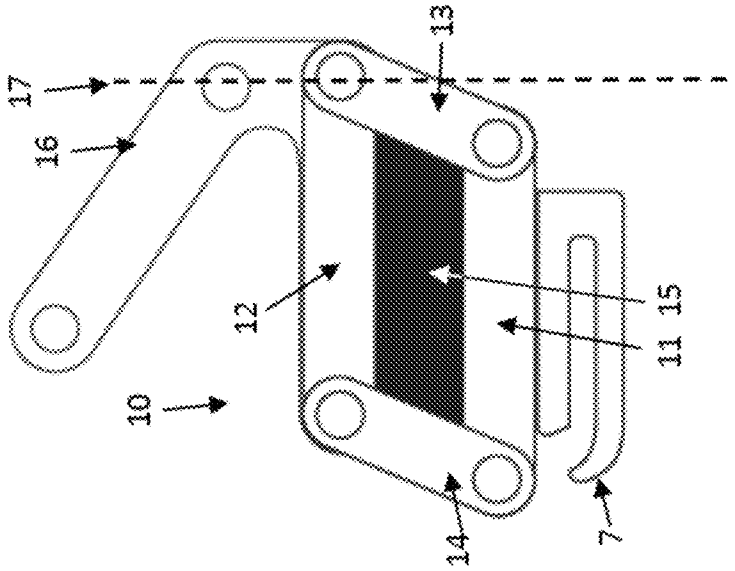

In this embodiment, the force accumulator 15 springs the stirrup holder 7 also in the first position shown in A). In B), a position of the damping device 10 is shown which e.g. occurs prior to the landing, when the mass of the rider loads the stirrup holder 7 and, thereby, first and second levers 14, 15 are pivoted and the second carrier 12 is moved into a greater distance from the first carrier 11 while the force accumulator 15 is tensioned. In FIG. 6C), a damping device 10 is shown in a second position in which the mass of the rider acting on the stirrup holder 7 pivots the first and second levers 13, 14 maximally against the force accumulator 15.

Figure 7:
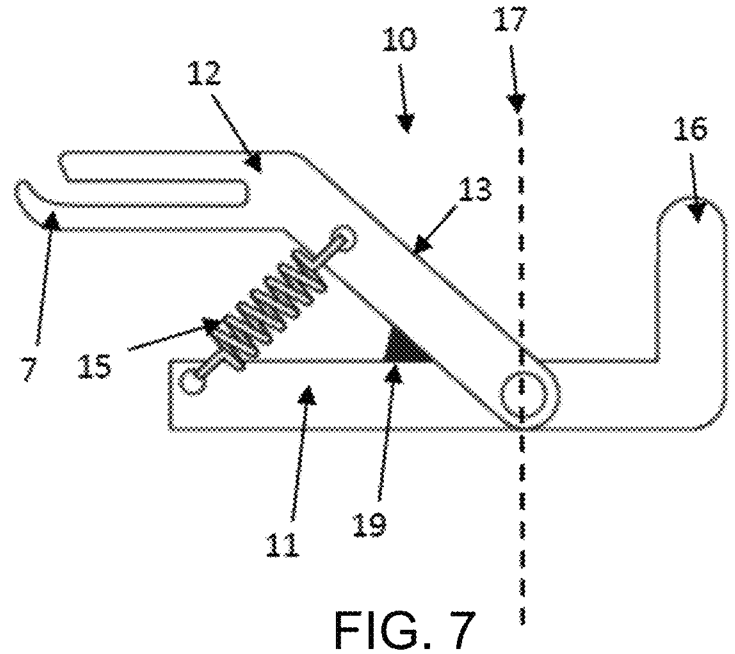
Figure 8:
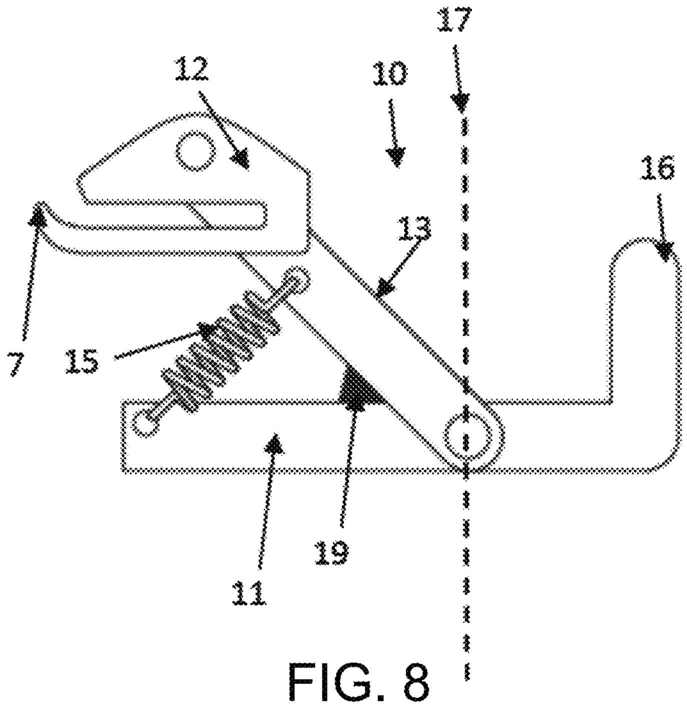

FIG. 7 and FIG. 8 show embodiments of the damping device 10 comprising or consisting of a first carrier 11, a first lever 13 pivotally hinged thereto, and a stirrup holder 7 arranged thereon opposite to the first carrier 11, the stirrup holder 7 having a force accumulator 15 loading the first lever 13 into the first position, optionally with a stop 19 against which the first lever 13 rests in the first position. The stirrup holder 7 is formed single-pieced with the second carrier 12. In the embodiment shown in FIG. 7, the stirrup holder 7 is pivotally hinged to the first lever 13. In the embodiment shown in FIG. 8, the stirrup holder 7 is formed in a rotationally fixed manner, e.g. single-pieced, with the first lever 13, wherein the stirrup holder 7 is arranged approximately horizontally in the first position shown here.

Figure 9:
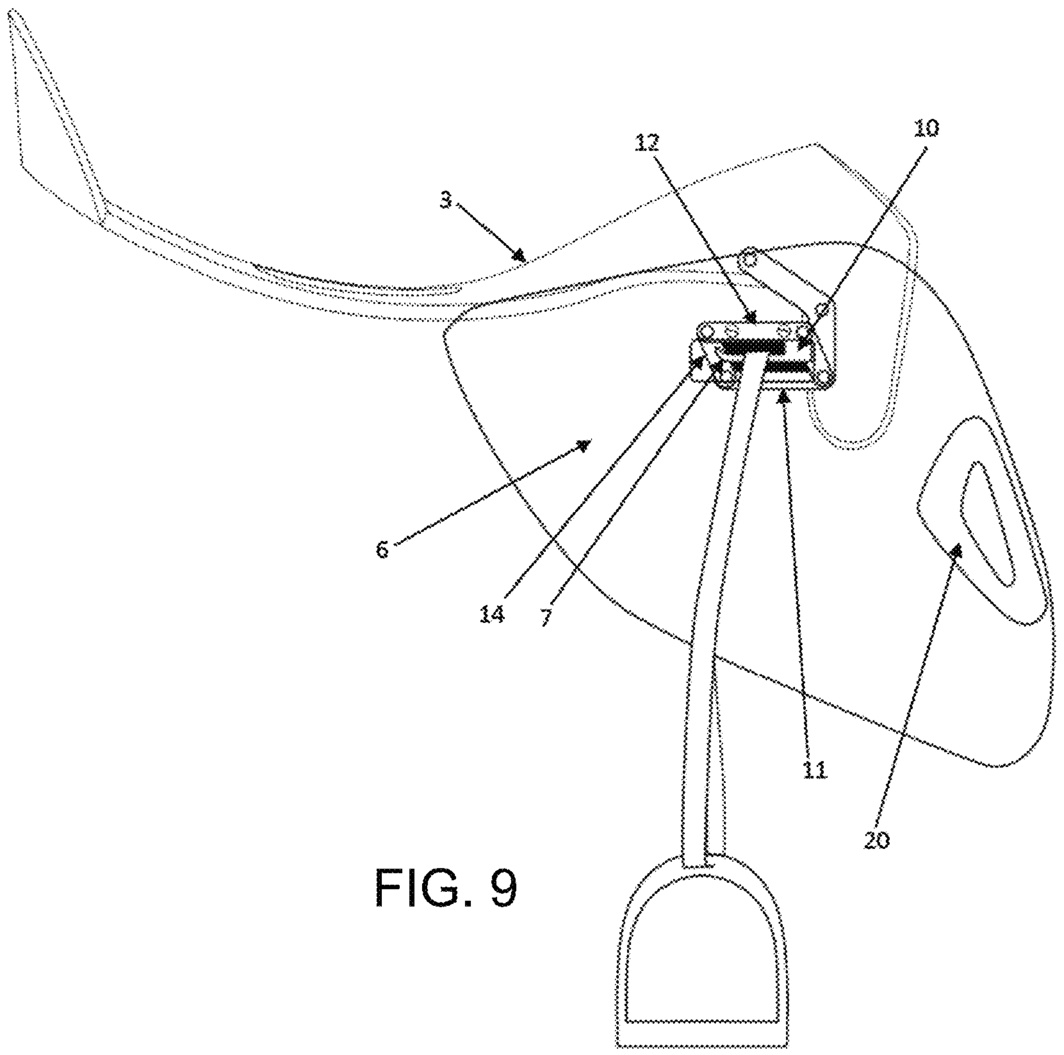

FIG. 9 shows an embodiment of a saddle according to the invention in which the stirrup holder 7 and the saddle flap 6, to which a knee roll 20 is attached, are both attached to a common damping device 10. In this embodiment, it is generally preferred that both the stirrup holder 7 and the saddle flap 6, to which the knee roll 20 is attached, are attached to the second carrier 12 of the damping device 10, the first carrier 11 of which is fixedly connected to the saddle tree 3, wherein the damping device in particular is one as described with reference to one of FIGS. 1 to 8.

Figure 10:
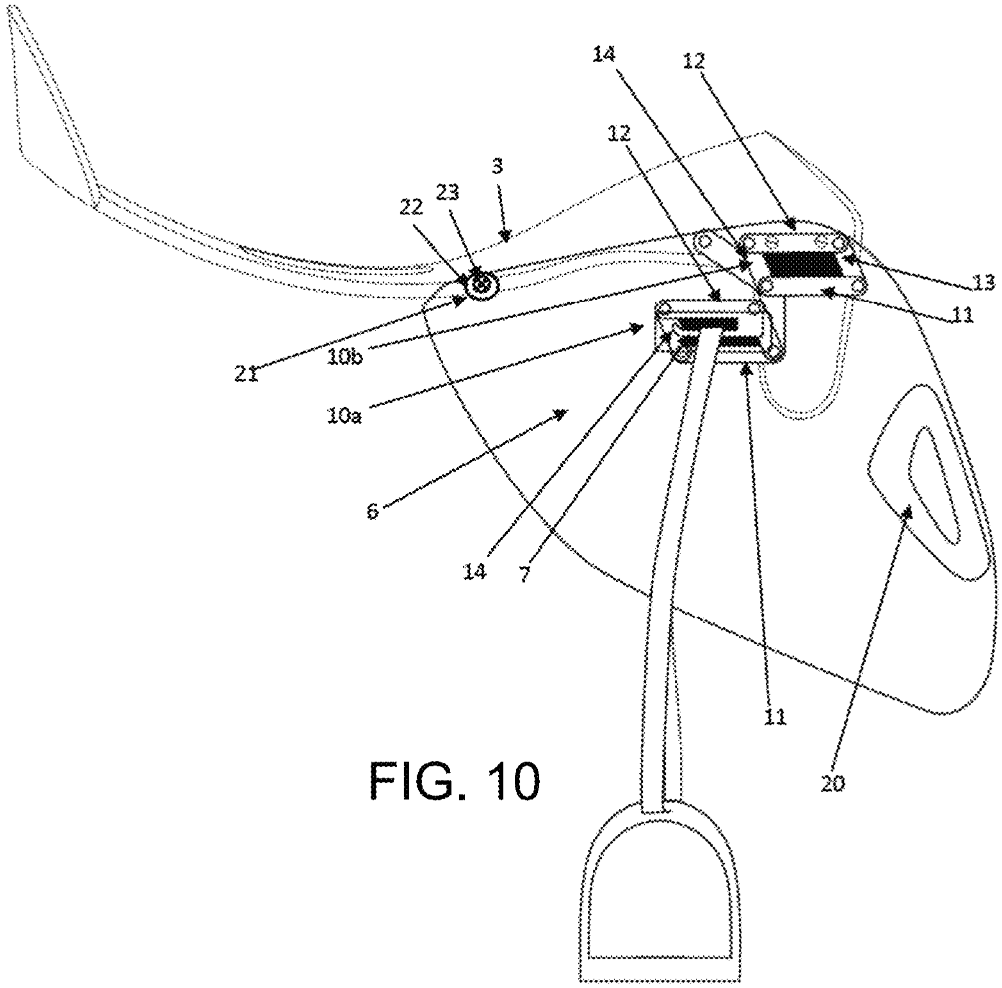

FIG. 10 shows an embodiment in which the stirrup holder 7 and the saddle flap 6, to which a knee roll 20 is attached, are each connected to the saddle tree 3 by means of a separate damping device 10*a*, 10*b*. The stirrup holder 7 is connected to the saddle tree 3 by means of a first damping device 10*a*, and the saddle flap 6, which supports the knee roll 20, is connected to the saddle tree 3 by means of a second damping device 10*b*. Therein, the second damping device 10*b* can be the same as the first damping device 10*a*. Alternatively, the second damping device 10*b* can be a simple spring. In this case, the saddle flap 6 is connected to the saddle tree 3 either only by means of the second damping device 10*b*, or optionally the saddle flap 6 is connected to the saddle tree 3 only by means of the second damping device 10*b* and by means of a pivot point 21 spaced therefrom. The pivot point 21 can e.g. be formed by an eyelet 22 in the saddle flap 6, in which a pin 23 attached to the saddle tree 3 engages.

Figure 11:
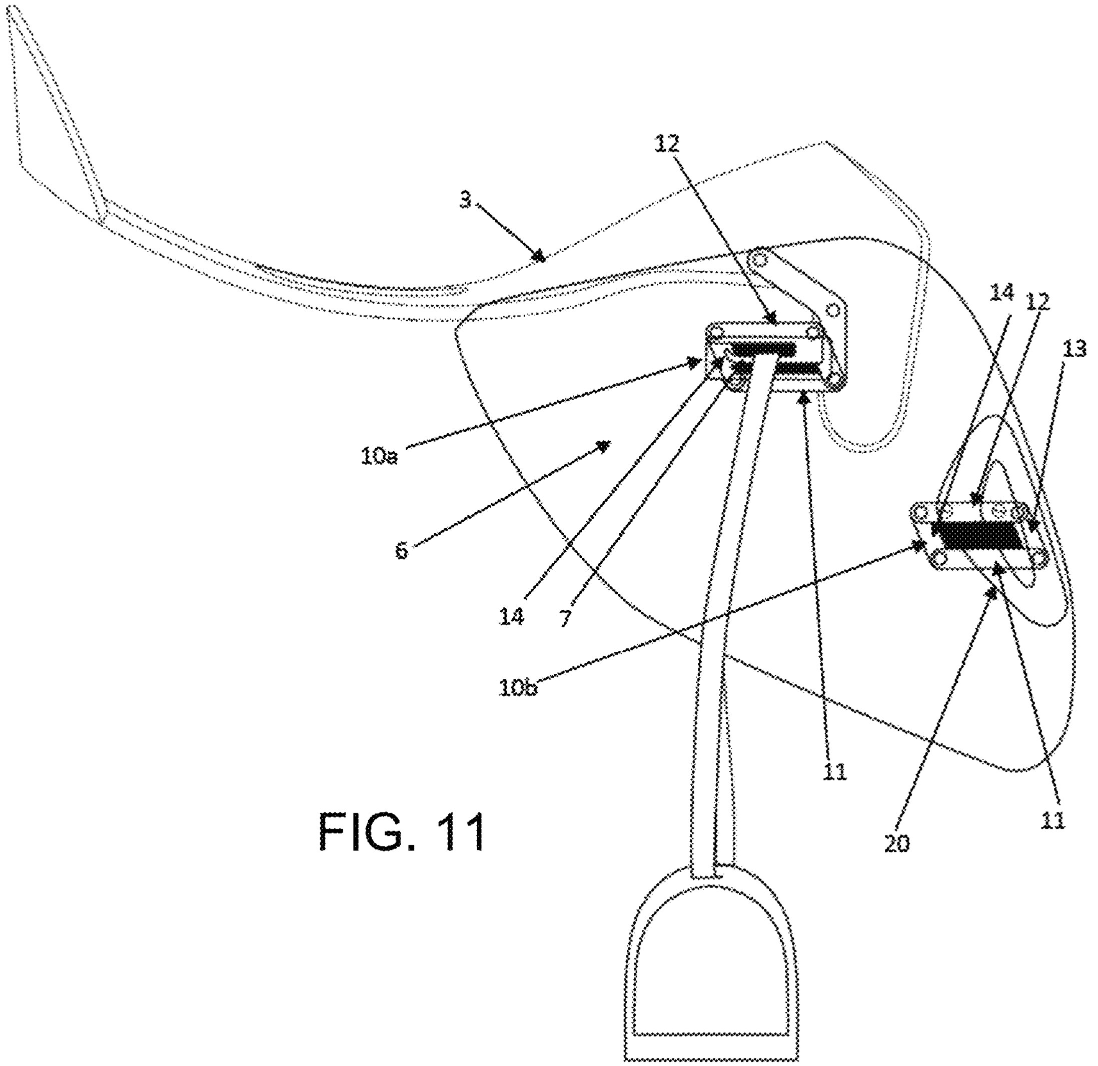

FIG. 11 shows an embodiment in which the stirrup holder 7 is attached to the saddle tree by means of a first damping device 10*a*, the saddle flap 6 supporting the knee roll 20 is directly or indirectly fixedly connected to the saddle tree 3, and the knee roll 20 is connected to the saddle flap 6 by means of a second damping device 10*b*. Especially in this embodiment, the second damping device 10*b* can be a tension spring or, as shown, a damping device 10 having a first carrier 11, which is attached to the saddle flap 6, and a second carrier 12, to which the knee roll 20 is attached and which is pivotally hinged to the first carrier 11 by means of a first lever 13, optionally additionally by means of a second lever 14. Generally, a force accumulator 15 counteracts the pivoting of the second carrier 12.

LIST OF REFERENCE SIGNS

1 saddle
2 seat surface
3 saddle tree
3*o* tree tip
4 pommel
5 cantle
6 saddle flap
7 stirrup holder
8 stirrup leather
9 stirrup
10 damping device
10*a* first damping device
10*b* second damping device
11 first carrier
12 second carrier
13 first lever
14 second lever
15 force accumulator
16 mounting arm
17 vertical 18 longitudinal axis
19 stop
20 knee roll
21 pivot point
22 eyelet
23 pin

The invention claimed is:

1. A riding, saddle comprising a saddle tree and a seat surface arranged thereon and, on each side of the paddle, a stirrup holder, the riding saddle comprising one or both of damping devices arranged between the saddle and each stirrup holder and damping devices arranged between the saddle tree and a saddle flap supporting a knee roll, the damping devices comprising a first carrier connected to the saddle and a second carrier pivotally connected to the first carrier by a first lever, wherein one or both of the stirrup bolder and the saddle flap is attached to the second carrier, the damping devices comprising a force accumulator configured to counteract movement of the second carrier from a first position over an apex of the pivoting, movement of the first lever into a second position to a greater distance from first carrier, wherein the riding saddle comprises, on each side of the saddle, a saddle flap having a knee roll and a damping device arranged between the saddle tree and the knee roll.

2. The riding saddle according to claim 1, the riding saddle comprising a second lever pivotally hinged to the first carrier and to the second carrier at a distance from the first lever.

3. The riding saddle according to claim 2, wherein the second lever is arranged in parallel to the first lever.

4. The riding saddle according to claim 1, wherein the second carrier is arranged in parallel to the first carrier when the force accumulator is relaxed.

5. The riding saddle according to claim 1, wherein the stirrup holder is formed single-pieced with the second carrier.

6. The riding saddle according to claim 1, wherein the second carrier loads into a first position towards the first carrier by the force accumulator.

7. The riding saddle according to claim 1, wherein the damping device is arranged between the saddle tree and the saddle flap supporting the knee roll, or the damping device is arranged between the saddle flap, which is fixedly connected to the saddle tree, and the knee roll.

8. The riding saddle according to one of claims 1 to 7, wherein the saddle flap and the stirrup holder are connected to the saddle tree by a common damping device.

9. The riding saddle according to claim 1, wherein the force accumulator is formed by a compression spring, a tension spring, a rubber buffer, a gas pressure spring, a fluid-filled shock absorber, or a combination of at least two of these.

10. The riding saddle according to claim 1, comprising a stop against which one or both of the first carrier and the second carrier rests in the first position in which the second carrier is at a small distance from the first carrier.

11. The riding saddle according to claim 10, wherein the stop is buffered against an elastic material of the force accumulator.

12. The riding saddle according to claim 1, wherein the damping device consists of a first carrier, a first lever pivotally hinged thereto, and opposite to the first carrier a stirrup holder pivotally or rotationally fixedly attached on the first lever.

13. The riding saddle according to claim 1, wherein the first carrier is arranged at a greater distance from the seat surface of the saddle than one or more of an end of the first lever, an end of the second lever, an end lying opposite to the first carrier, and the second carrier.

14. The riding saddle according to claim 1, wherein the first carrier is arranged at a smaller distance from the seat surface of the saddle than one or more of the second carrier, an end of the first lever, an end of the second lever, and an end lying opposite to the first carrier.

15. The riding saddle according to claim 1, wherein the first carrier is arranged at a greater distance from the seat surface than the second carrier, so that the first carrier is fixed to the saddle below the second carrier when the seat surface is arranged above the stirrup holder.

16. A riding, saddle comprising a saddle tree and a seat surface arranged thereon and, on each side of the paddle, a stirrup holder, the riding saddle comprising one or both of damping devices arranged between the saddle and each stirrup holder and damping devices arranged between the saddle tree and a saddle flap supporting a knee roll, the damping devices comprising a first carrier connected to the saddle and a second carrier pivotally connected to the first carrier by a first lever, wherein one or both of the stirrup bolder and the saddle flap is attached to the second carrier, the damping devices comprising a force accumulator configured to counteract movement of the second carrier from a first position over an apex of the pivoting, movement of the first lever into a second position to a greater distance from first carrier, wherein the stirrup holder is formed single-pieced with the second carrier and is pivotally hinged to the first lever or is rigidly fixed to the first lever.

17. A riding saddle comprising a saddle tree and a seat surface arranged thereon and, on each side of the saddle, a stirrup holder, and on each side of the saddle a saddle flap supporting a knee roll, the riding saddle comprising damping devices arranged between one or both of each saddle flap and each knee roll and between the saddle tree and the saddle flap supporting the knee roll, each damping device comprising a first carrier connected to the saddle tree or to the saddle flap, and a second carrier pivotally hinged to the first carrier on a first lever, wherein the knee roll is attached to the second carrier, and the saddle comprises a force accumulator configured to counteract movement of the second carrier from a first position over an apex of the pivoting movement of the first lever into a second position into a greater distance from the first carrier.

18. A riding saddle comprising a saddle tree and a seat surface arranged thereon, a stirrup holder on each side of the saddle, a damping device attached between the saddle and knee rolls, wherein a part of the saddle to which the damping device is attached is a saddle flap fixedly connected to the saddle tree, wherein the damping device at a first carrier has a mounting arm rigidly connected to the first carrier, which mounting arm is fixed to the saddle, or wherein the first carrier is directly connected to the saddle, wherein the first carrier is connected to the second carrier by a first lever which by its ends is pivotably connected to the first and to the second carriers, wherein at least one force accumulator is connected to one or more of the carriers, the first lever, and a second lever, wherein the force accumulator is configured to load the first and second carriers into a first position in which they are arranged closer to one another than at their maximum distance from one another, in which the first and second levers extend maximally away from the carriers, limited by the length of the levers, and wherein the force accumulator is configured to be tensioned when the second carrier from the first position is pivoted away from the first carrier.

* * * * *